3,244,648
PHENOL-FURFURAL RESIN COMPOSITIONS
Leopold F. Bornstein, Lexington, Mass., assignor, by
 mesne assignments, to National Polychemicals, Inc.
 No Drawing. Filed Dec. 28, 1962, Ser. No. 247,810
 20 Claims. (Cl. 260—3)

My invention relates to alkylated hydroxy aromatic-alicyclic aldehyde compositions, and in particular to polymethylene polyphenol-furfural resins and to compositions and products derived therefrom.

Phenolic-aldehyde resins are generally highly brittle low impact strength products of limited compatibility with other plastics. Plasticizers have been employed with these products to increase the flexibility, but increased flexibility has resulted in the diminution of other desirable properties, processing difficulties, or intolerable cost factors. For example, to obtain any significant degree of flexibility relatively large amounts of up to or more than equal parts of glycols or glycerine must be used which diminishes the product strength and induces sweating out of the glycol and glycerine during the heat curing cycle. Further, plasticization by cross linking with unsaturated thermoplastic polymers like polyvinylbutyral or compatible elastomers like Hycar has not been wholly satisfactory because of the lowered heat and solvent resistance of the resulting mixtures. These mixtures have improved impact strength, but still lack suitable flexibility. Furthermore, unsaturated oils like tung oil even in substantial amounts as resin modifiers fail to provide sufficient flexibility. There thus exists a need for a thermosetting resin having good compatibility and flexibility characteristics.

It is therefore an object of my invention to provide novel resins of greatly enhanced flexibility. Another object of my invention is to provide resinous products of good solubility in alcohol. Another object of my invention is to provide resinous products of relatively permanent flexibility which are capable of curing at elevated temperatures without degradation of the flexibility properties. A further object of my invention is to provide for compatible plastic compositions, articles and films exhibiting thermosetting characteristics.

Further objects and advantages of my invention will be apparent to those skilled in the art from the following description and examples of my invention.

I have discovered that the reaction of an aldehyde substituted ethylenically unsaturated conjugated cyclic ether with a polyaliphatic hydroxy aromatic compound unexpectedly yields a resinous product of exceptional rubber-like flexibility, enhanced alcohol solubility, and of superior compatibility with thermoplastic polymers, resins, latices, and other compounds. The novel resins of my invention are prepared by the condensation of a spaced phenol with furfural to form a liquid heat curable resinous product wholly soluble in ethanol, insoluble in water, and compatible with thermoplastic vinyl compounds. The cured resins of my invention are soft rubber-like flexible resinous products exhibiting thermosetting characteristics, being heat and solvent resistant.

The spaced phenols employed with furfural to yield the novel flexible resins of my invention are those compounds comprising polyhydroxylated aromatic nuclei spatially separated by long chain aliphatic and substituted aliphatic carbon-to-carbon chains. In particular these wax phenol or spaced polyphenols comprises those polyalkylene polyhydroxy aromatic compounds wherein two, three, four, five, six or more hydroxy aromatic nuclei are interconnected by long polyalkylene chains. These compounds include those polymethylene polyphenols and mixtures having the general formulas:

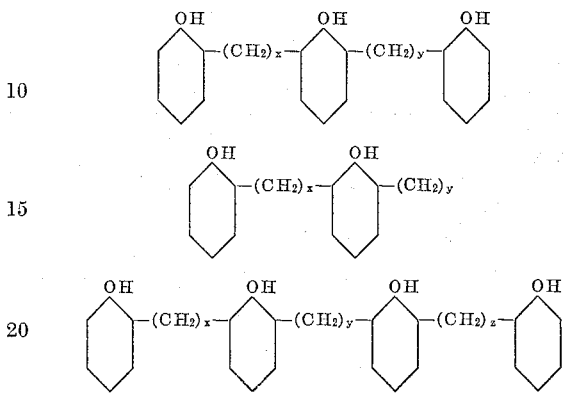

wherein $x$, $y$ and $z$ can be the same or different and range from about 10 to 100, for example 20 to 40. The polymethylene, polyhydroxy aromatic compounds contain two or more hydroxy aromatic nuclei preferably phenolic nuclei, such as phenol, and its alkyl, halogen and methylol derivatives and homologues and substituents. The spaced phenols of particular utility include those compounds wherein two or more such as 2 to 6 phenol nuclei are separated by at least one or more long chain paraffinic groups or their methylol or halogen substituted derivatives or combinations thereof. One or more of these long chain polymethylene groups can also be in one or both terminal aromatic groups. A particularly preferred wax phenol comprises those polymethylene polyphenols and polymethylol polyphenols the preparation and description of which is set forth in U.S. Patents 2,800,512, 2,859,203, and 2,859,204 which are hereby incorporated by reference in their entirety. The wax phenol-formaldehyde resins prepared in the past both before and after cure have been relatively incompatible with other plastics. These resinous products have also not been wholly soluble in ethanol, and required the employment of aromatic-alcohol solution for complete solvation.

The liquid heat curable spaced phenol-furfural resins of my invention are prepared by the direct condensation in either an alkaline or acid medium of the wax phenol with furfural. The proportions of spaced phenol to furfural will vary depending upon the resin properties desired, but may range from about 0.1 to 2.0 (e.g. 0.5 to 1.5) moles of furfural per mole of spaced phenol. The reaction can take place in bulk or in a hydrocarbon or alcohol solution. The liquid resinous product obtained is water insoluble, but wholly miscible in alcohols such as alkanols like ethanol, isopropanol, butanol etc. and in alcohol solution containing aromatic and aliphatic hydrocarbon diluents like toluene, xylene, heptane, naphthas etc. to form improved lacquer solutions. Suitable solvents include aromatic alcohols, esters, ketones or mixtures thereof.

These liquid resins upon heating at elevated temperatures are cured to soft rubber-like very flexible C stage resins having high heat and solvent resistance, high impact strength, and on storage, heating, or use inhibit surface blooming, embrittlement, or loss of flexibility. These cured resins exhibit rubber-like qualities in flexibility and touch, but retain their thermosetting characteristics. For example, a strip of a cured spaced phenol-furfural resin can be easily flexed or doubled over 180 degrees.

In the condensation reaction the spaced phenol can be admixed with varying amounts of from 1 to 50 weight percent or of a polyhydric aromatic compound such as phenol or its alkyl, aromatic and other derivatives and homologues, cresols, resorcinol, etc. and mixtures thereof. Also minor amounts of other aldehydes such as up to 25 weight percent of formaldehyde, acetaldehyde or paraformaldehyde can be employed with furfural for reaction with the spaced phenol or spaced phenol-phenol combination. Of course, the employment of phenol or phenol homologues or derivatives and the use of other adehydes may result in a rapid diminution of the superior solubility, compatibility and flexibility characteristics of the spaced phenol-furfural resins. Phenol can be employed as a cost extender and as a cure promoter for the spaced phenols.

My novel resins can be prepared by acid or alkaline catalyzed reaction of the spaced phenol and furfural. The alkaline catalyst can be a basic alkali or alkaline earth or metal hydroxide, oxide or carbonate such as sodium hydroxide, potassium hydroxide, potassium carbonate. Suitable organic alkaline catalyst include amines such as tertiary amines, alkylene and polyalkylene polyamines like ethylene diamine and the like. Suitable acid catalysts include organic and mineral acids like sulfuric acid, hydrochloric acid, or oxalic acid where a controlled reaction and lighter color products are desired. The liquid resins are commonly prepared by reacting in bulk the spaced phenol and furfural at a temperature of from about 50° C. to 180° C. e.g. 80–130° C. in the presence of the catalyst. The liquid resin is then cooled and cured in bulk or in an alcohol or alcohol-hydrocarbon solution at elevated temperatures of about 100 to 200° C. or more. Curing in the absence of an accelerating catalyst at 150° C. commonly requires from 30 seconds to 5 minutes while with a catalyst the curing time is about 15 seconds to 2 minutes. Curing can be accelerated by the addition of ethylene, diamine, a formaldehyde-source compound such as paraformaldehyde, hexamethylene tetraamine, and the like or mixtures thereof.

The preparation and properties of these novel resins and resin-containing compositions of my invention are more specifically described in the following examples:

*Example I*

A liquid alcohol soluble spaced phenol-furural resin was prepared by the following formulation:

Flexiphen 160 [1] _____ 900 grams.
Furfural _____ 250 grams.
Sodium hydroxide _____ 7.5 grams in 5 grams of water.

[1] Flexiphen 160 is a polymethylene polyphenol mixture (M.W. about 315) produced by the Koppers Co., Inc. (see Bulletin P.D. 105) which has about 2 to 4 phenolic nuclei separated by polymethylene chains of approximately 25 carbon atoms. Flexiphen 160 is a viscous material soluble in benzene, ketones and alcohols and insoluble in caustic solutions and water and has the following specifications:

Free phenol, wt. percent, max. _____ 1.0
Chlorine, wt. percent, max. _____ 2.0
Phenol equivalent, grams _____ 350±10

The components were refluxed at 95–100° C. for 30 minutes to produce a liquid heat curable resin completely and clearly soluble in 99% isopropanol and in mixtures of alcohol and aromatic solvents like benzene, toluene and xylene. The alcohol resin solution had the following properties:

Solid content _____percent__ 87
pH _____ 8.1
Stroke test @ 150° C. _____ 2 min. 5 sec.

Thus unlike spaced phenol-formaldehyde resins the liquid spaced phenol-furfural resins are wholly miscible with alcohols thereby producing superior lacquer, coating and impregnation solutions.

*Example II*

A novel liquid spaced phenol-furfural resin was prepared according to the following formulation:

Grams
Flexiphen 160 _____ 205
Furfural _____ 57

These components were heated to 90° C., 1.2 grams of ethylene diamine added and the mixture refluxed at 115–120° C. for 30 minutes. The resin was cooled to 40° C. and 34 grams of a 50% solution of methyl-formcel added to yield a resin solution having the following properties:

Solid content _____percent__ 68½
pH _____ 6.5
Viscosity _____c.p.s__ 1000–1500

Upon the addition of 1 weight percent of ethylene diamine, the resin cured to a soft flexible rubber-like product of thermosetting characteristics in 1 minute and 40 seconds at 150° C. At the same temperature and with the addition of 20% methyl-formcel the resin cures in about 75 seconds.

*Example III*

A spaced phenol (phenol modified)-furfural (formaldehyde modified) resin of controlled flexibility was prepared by heating 675 grams of Fexiphen 160 with 200 grams of furfural to 70° C. Ten grams of ethylene diamine was added and the resin refluxed for 30 minutes at 95–100° C. The resin was cooled to 60° C., 35 grams of paraformaldehyde added and the mixture heated at 60–70° C. for 30 minutes. Then 2000 grams of furfural were added, the resin heated for 50 minutes at 95—100° C., 3900 grams of phenol added and heating continued for 15 minutes at the same temperature. The liquid resin had a solid content of about 80–85%. The resin is heat cured in about 4 minutes and 10 seconds. Cure can be accelerated by formaldehyde sources or a diamine. The liquid resin was clearly soluble in 99% isopropanol and was compatible in all proportions with the resins of Examples 1 and 2.

Cured films of the straight spaced phenol-furfural resins and the phenol and formaldehyde modified resin of Example 3 exhibited various degrees of flexibility. The straight spaced phenol-furfural resin films were wholly flexible while the modified resins exhibited reduced flexibility.

As thus described the spaced phenol-furfural liquid resins are surprisingly entirely soluble in alcohols, and on curing have exceptional flexibility.

*Example IV*

A straight spaced phenol-furfural liquid resin of the examples which was insoluble in water was added to a commercial 55 weight percent polyvinyl acetate emulsion. The straight spaced phenol-furfural resinous product was fully compatible in all proportions with the polyvinyl acetate. The previous water insoluble spaced phenol-furfural liquid resin readily dissolved in this emulsion. Films cast from this solution were strong, homogeneous, clear, transparent films indicating the compatibility of the liquid resin with polyvinyl esters of sort chain fatty acids. These films exhibited excellent flexibility characteristics, and were heat curable to provide a thermoplastic film of thermosetting characteristics. These films on heat curing exhibited excellent heat and solvent resistance. Thus the novel liquid or solid spaced phenol-furfural resins of my invention can be employed as non-volatile plasticizers in thermoplastic films or compositions or as modifiers to improve the heat and solvent resistance of thermoplastics.

Further, the solid spaced phenol-furfural resins of my invention were wholly compatible with polyvinyl chloride and polyvinyl chloride-polyvinyl acetate copolymers to form homogeneous solid films and compositions. Thus homo and copolymers of vinyl resins such as polyvinyl halides and its copolymers with vinyl acetates, vinylidene halides, vinylene halides, and other ethylenically unsaturated derived or containing compounds and polymers can be employed with liquid spaced phenol-furfural resins to produce novel heat curable compositions such as plastisol compositions with or without the high boiling point plasticizing esters and compounds like alkyl phthalates and the like.

The novel liquid or solid spaced phenol-furfural resins of my invention can be profitably employed in amounts from 2 to 98 weight percent with a wide variety of polymers and plastic thermosetting and thermoplastic compounds which include but are not limited to: polyvinyl esters like polyvinyl acetate; vinyl polymers and copolymers; styrene polymers and copolymers like polystyrene; phenolics like phenol-formaldehyde; urea-formaldehyde resins; polyesters; polyureathanes; polyalkylenes like polyethylene, polypropylene and their copolymers; epoxy resins; polyamides like nylon; acrylates like polyacrylate and its copolymers; alkyl resins; cellulosic resins like cellulose acetate, cellulose acetate butyrate; furane resins, natural and synthetic hydrocarbon resins like polyterpenes, petroleum resins, polybutenes; fluorocarbons; polycarbonates; silicones; and natural and synthetic elastomers like neoprene, butyl rubber, halogenated butyl rubber, nitrile rubbers like acrylonitrile-butadiene copolymers, butadiene-styrene copolymers, ethylene-propylene copolymers and terpolymers with dienes like dicyclopentadiene, natural rubber, polybutadiene and other thermoplastic and thermosetting compounds and polymers and unsaturated drying oils, lubricants, asphalt, waxes, greases and the like. The addition of modifying amounts of spaced phenol-furfural resins to crystalline polymers improves the low temperature impact strength, while addition to thermoplastic polymers improves heat and solvent resistance and addition to thermosetting resins enhances their flexibility properties.

The resins and resin-containing compositions of my invention can be further blended with minor or major amounts of pigments, plasticizers, lubricants, stabilizers, neutralizers, metal soaps, inert fiberous and particle fillers, glass fibers, asbestos, carbon black, wood flour, saw dust, diatamaceous earths, clay, metal oxides, carbonates, cellulosic fibers, and the like.

The novel resins of my invention are useful in: the impregnation and saturation of woven or non-woven synthetic or natural fibers and fabrics such as cellulosic paper, asbestos, cork, sheets, and tiles, glass fiber mats, canvas, cotton fabrics to impart desired flexibility characteristics and to give excellent cold punching properties such as with electrical grade laminates and other laminate structures formed by heat and pressure. These resinous products are useful in coating from emulsion and organic solutions to impart heat and solvent resistance properties; a bonding agents for furniture, plywood, composition or particle boards, brake linings, grinding wheels, clutch facings etc. having improved impact and shock resistance; as coating lacquers; and as molding compounds with or without inert fillers to provide on curing improved low temperature impact strength coupled with excellent shock resistance; a tire cord adhesive etc.

What is claimed is:

1. The method of preparing a homogenous alcohol-soluble, thermosetting resinous reaction product, which method comprises: reacting together, in the absence of monohydroxy phenols, at a temperature of between about 50° and 180° C., a polyalkylene spaced polyphenol and furfural, the mol ratio of furfural to polyphenol being from about 0.1 to 2.0.

2. The method of claim 1 wherein the polyphenol is a polymethylene polyphenol.

3. The method of claim 1 wherein the reaction is carried out in a one-step reaction at a temperature of between about 80° and 130° C. under alkaline conditions.

4. The method of claim 1 wherein the resinous reaction product of claim 1 is reacted with resorcinol, phenol or an alkylated phenol.

5. The thermosetting resinous reaction product prepared by the method of claim 1.

6. The method of claim 1 wherein the resinous reaction product of claim 1 is reacted with formaldehyde, paraformaldehyde or hexamethylenetetraamine.

7. The insoluble, infusible, flexible, resinous reaction product obtained by curing the thermosetting resinous reaction product prepared by the method of claim 1.

8. The method of claim 1 which includes curing the resinous reaction product of calim 1 by adding a curing amount of a cure promoter and heating the resinous reaction product to a curing temperature of between about 100° and 200° C.

9. The method of preparing a one-step thermosetting resinous reaction product, which method comprises: reacting together, in the absence of monohydroxy phenols a polymethylene spaced polyphenol, the polymethylene groups having at least 10 carbon atoms and the polyphenol containing from 2 to 6 phenol groups per molecule, with furfural under alkaline conditions at a temperature of between about 50° and 180° C., the mol ratio of furfural to polyphenol being from about 0.1 to 2.0, thereby providing a clear, homogeneous thermosetting resinous product soluble in isopropanol.

10. The homogenous, infusible, insoluble, flexible resinous reaction product prepared by heating the resinous reaction product of claim 9.

11. The alcohol-soluble, homogeneous, thermosetting, resinous, reaction product prepared by the method of claim 9.

12. A laminate comprising fibrous sheet material impregnated with the resinous reaction product of claim 1.

13. A molding compound comprising the fusible, resinous, reaction product prepared by the method of claim 1 and a fibrous filler material.

14. A molded article prepared by curing under heat and pressure, the molding compound of claim 13.

15. A coating solution comprising the resinous reaction product prepared by the method of claim 1 and an alcohol.

16. A new composition of matter comprising the resinous reaction product prepared by the method of claim 1 and an organic polymeric material compatible with the said resinous reaction products.

17. A new composition of matter comprising the resinous reaction product prepared by the method of claim 9 and an organic thermoplastic polymer.

18. The method of claim 9 wherein phenol is added to the resinous reaction product of claim 9 and formaldehyde added to react with the phenol, thereby producing a modified, inexpensive, homogeneous, less flexible, thermosetting reinous reaction product.

19. The insoluble, infusible, resinous reaction product prepared by curing the modified reaction product of claim 18.

20. The new composition of matter comprising the resinous reaction product prepared by the method of claim 9 and an organic polymer compatible with the resinous reaction product and selected from the group consisting of epoxy resins, polyvinyl acetate, styrene polymers ,vinyl chloride resins, polyamide resins, acrylic resins, natural rubber, copolymers of butadiene and styrene, copolymers of butadiene and acrylonitrile, copolymers of ethylene-propylene and diene modified terpolymers thereof, polybutadiene, polyethylene, polypropylene, butyl rubber and blends thereof.

References Cited by the Examiner

UNITED STATES PATENTS 2,218,373  10/1940  Alexander.
2,859,204  11/1958  Florentine et al. _____ 260—59

FOREIGN PATENTS 243,470  12/1925  Great Britain.
323,036  12/1929  Great Britain.

OTHER REFERENCES

Beckmann et al.: The Action of Furfural on Phenols (communication from the Kaiser Wilhelm Institute of Chemistry in Berlin-Dahlem).

WILLIAM SHORT, *Primary Examiner.*

LOUISE P. QUAST, *Examiner.*

VICTOR A. MORGENSTERN, H. SCHAIN,
*Assistant Examiners.*